United States Patent
Rinaldi et al.

(10) Patent No.: US 11,681,799 B2
(45) Date of Patent: *Jun. 20, 2023

(54) USING TRAP CACHE SEGMENTS TO DETECT MALICIOUS PROCESSES

(71) Applicant: International Business Machines Corporation, Armonk, NY (US)

(72) Inventors: Brian A. Rinaldi, Tucson, AZ (US); Clint A. Hardy, Tucson, AZ (US); Lokesh M. Gupta, Tuscon, AZ (US); Kevin J. Ash, Tucson, AZ (US)

(73) Assignee: INTERNATIONAL BUSINES MACHINES CORPORATION, Armonk, NY (US)

( * ) Notice: Subject to any disclaimer, the term of this patent is extended or adjusted under 35 U.S.C. 154(b) by 400 days.

This patent is subject to a terminal disclaimer.

(21) Appl. No.: 17/132,630

(22) Filed: Dec. 23, 2020

(65) Prior Publication Data

US 2021/0117541 A1  Apr. 22, 2021

Related U.S. Application Data

(63) Continuation of application No. 16/129,616, filed on Sep. 12, 2018, now Pat. No. 11,080,397.

(51) Int. Cl.
*G06F 21/56* (2013.01)
*G06F 12/14* (2006.01)

(52) U.S. Cl.
CPC .......... *G06F 21/56* (2013.01); *G06F 12/1458* (2013.01); *G06F 2212/1052* (2013.01); *G06F 2221/034* (2013.01)

(58) Field of Classification Search
CPC .................................................. G06F 21/56
See application file for complete search history.

(56) References Cited

U.S. PATENT DOCUMENTS

| | | |
|---|---|---|
| 7,032,114 B1 | 4/2006 | Moran |
| 7,065,657 B1 | 6/2006 | Moran |
| 8,413,241 B2 | 4/2013 | Weeks et al. |
| 9,485,276 B2 | 11/2016 | Quinlan et al. |
| 10,609,066 B1 | 3/2020 | Nossik et al. |

(Continued)

OTHER PUBLICATIONS

List of Patents and Publications Treated as Related, dated Dec. 23, 2020, Total 2 pages.

(Continued)

*Primary Examiner* — Simon P Kanaan
(74) *Attorney, Agent, or Firm* — Konrad Raynes Davda & Victor LLP; David W. Victor; Alan S. Raynes

(57) ABSTRACT

Provided are a computer program product, system, and method for using trap cache segments to detect malicious processes. A trap cache segment to the cache for data in the storage and indicated as a trap cache segment. Cache segments are added to the cache having data from the storage that are not indicated as trap cache segments. A memory function call from a process executing in the computer system reads data from a region of a memory device to output the read data to a buffer of the memory device. A determination is made as to whether the region of the memory device includes the trap cache segment. The memory function call is blocked and the process is treated as a potentially malicious process in response to determining that the region includes the trap cache segment.

20 Claims, 6 Drawing Sheets

(56) References Cited

U.S. PATENT DOCUMENTS

| | | | |
|---|---|---|---|
| 2003/0172293 | A1 | 9/2003 | Johnson et al. |
| 2012/0066765 | A1 | 3/2012 | OBrien |
| 2012/0254995 | A1 | 10/2012 | Sallam |
| 2012/0255010 | A1 | 10/2012 | Sallam |
| 2013/0132690 | A1 | 5/2013 | Epstein |
| 2013/0198474 | A1 | 8/2013 | Shaath |
| 2014/0115652 | A1 | 4/2014 | Kapoor et al. |
| 2015/0370496 | A1 | 12/2015 | Stevens |
| 2016/0012222 | A1 | 1/2016 | Stolfo et al. |
| 2016/0371496 | A1 | 12/2016 | Sell |
| 2017/0324755 | A1 | 11/2017 | Dekel et al. |
| 2018/0075236 | A1 | 3/2018 | Kwon et al. |
| 2018/0121650 | A1 | 5/2018 | Brown |
| 2018/0262529 | A1 | 9/2018 | Allen |
| 2018/0322280 | A1 | 11/2018 | Borlick et al. |
| 2019/0080082 | A1 | 3/2019 | Desai et al. |
| 2019/0121571 | A1 | 4/2019 | Wahla et al. |
| 2019/0318094 | A1 | 10/2019 | Sun et al. |
| 2020/0082075 | A1 | 3/2020 | Rinaldi et al. |
| 2020/0082076 | A1 | 3/2020 | Rinaldi et al. |

OTHER PUBLICATIONS

Whitham, Ben, "Canary Files: Generating Fake Files to Detect Critical Data Loss from Complex Computer Networks," The Second International Conference on Cyber Security, Cyber Peacefare and Digital Forensic (CyberSec2013), pp. 170-179. The Society of Digital Information and Wireless Communication, 2013.

U.S. Appl. No. 15/954,334, dated Apr. 16, 2018, invented by Matthew G. Borlick et al., Total 32 pages.

US Patent Application, for U.S. Appl. No. 15/456,095, dated Mar. 10, 2017, invented by Peter G. Sutton et al., Total 33 pages.

US Patent Application , for U.S. Appl. No. 15/954,341, dated Apr. 16, 2018, invented by Matthew G. Borlick et al., Total 41 pages.

US Patent Application, U.S. Appl. No. 16/129,608, dated Sep. 12, 2018, invented by B.A. Rinaldi et al., Total 34 pages.

Office Action1, dated Oct. 29, 2020, for U.S. Appl. No. 16/129,608, dated Sep. 12, 2018, invented by B.A. Rinaldi et al., Total 27 pages.

U.S. Appl. No. 16/129,616, dated Sep. 12, 2018 , invented by Brian A. Rinaldi et al., Total 34 pages.

Office Action dated Jun. 11, 2020, for U.S. Appl. No. 16/129,616, filed Sep. 12, 2018, invented by Brian A. Rinaldi et al., Total 12 pages.

Response to Office Action, dated Sep. 11, 2020, for U.S. Appl. No. 16/129,616, filed Sep. 12, 2018, invented by Brian A. Rinaldi et al., Total 12 pages.

Notice of Allowance, dated Nov. 4, 2020, for U.S. Appl. No. 16/129,616, filed Sep. 12, 2018, invented by Brian A. Rinaldi et al., Total 5 pages.

Notice of Allowance,dated Feb. 19, 2021, for U.S. Appl. No. 16/129,608, dated Sep. 12, 2018, invented by B.A. Rinaldi et al., Total 15 pages.

Kumar, Sanjeev et al. Hybrid honeypot framework for malware collection and analysis. 2012 IEEE 7th International Conference on Industrial and Information Systems (ICIIS). https://ieeexplore.ieee.org/stamp/stamp.jsp?tp=&arnumber=6304786 (Year: 2012).

Bombardieri, Michele etal. Honeypot-Powered Malware Reverse Engineering. 2016 IEEE International Conference on Cloud Engineering Workshop (IC2EW). https://ieeexplore.ieee.org/stamp/stamp.jsp?tp=&arnumber=7527817 (Year: 2016).

Paul, Sounak; Mishra, Bimal Kumar. Honeypot based signature generation for defense against polymorphic worm attacks in networks. 2013 3rd IEEE International Advance Computing Conference (IACC). https://ieeexplore.ieee.org/stamp/stamp.jsp?tp=&arnumber=6514213 (Year: 2013).

Response to Office Actionl, dated Jan. 29, 20, for U.S. Appl. No. 16/129,608, filed Sep. 12, 2018, total 12 pages.

Notice of Allowance2, dated Mar. 31, 2021, for U.S. Appl. No. 16/129,616, filed Sep. 12, 2018, invented by B.A. Rinaldi et al., Total 8 pages.

USING TRAP CACHE SEGMENTS TO DETECT MALICIOUS PROCESSES

This application is a continuation of U.S. patent application Ser. No. 16/129,616, filed Sep. 12, 2018, which application is incorporated herein by reference in its entirety.

BACKGROUND OF THE INVENTION

1. Field of the Invention

The present invention relates to a computer program product, system, and method for using trap cache segments to detect malicious processes.

2. Description of the Related Art

Anti-malware software, also known as anti-virus software, is used to detect, prevent and remove malicious software, such as malicious browser helper objects (BHOs), browser hijackers, ransomware, key loggers, backdoors, rootkits, Trojan horses, worms, malicious LSPs, dialers, fraud tools, adware and spyware. Typically when there is a possible data breach from malicious software, access to the data subject to the breach is blocked until the security threat is resolved, so as to avoid any alteration of data by the suspicious software. One type of malicious software known as ransomware encrypts user data, and then the operator of the ransomware blackmails the victim of the attack requiring payment for the encryption key to use to decrypt their data.

Malicious code may try to randomly access data in memory by reading from the memory to try to access sensitive information stored in the memory.

There is a need in the art for improved techniques for detecting malicious code attempting to access protected data stored in cache to prevent malevolent activity and compromising data.

SUMMARY

Provided are a computer program product, system, and method for using trap cache segments to detect malicious processes. A trap cache segment to the cache for data in the storage and indicated as a trap cache segment. Cache segments are added to the cache having data from the storage that are not indicated as trap cache segments. A memory function call from a process executing in the computer system reads data from a region of a memory device to output the read data to a buffer of the memory device. A determination is made as to whether the region of the memory device includes the trap cache segment. The memory function call is blocked and the process is treated as a potentially malicious process in response to determining that the region includes the trap cache segment.

With the above embodiment, malicious processes trying to access memory through memory function calls to access sensitive and protected data may be detected by including trap cache segments in the cache. Legitimate processes in the host systems trying to perform read and writes to the cache segments would access cache segments, including trap cache segments identifying a track subject to the host read or write request, through the cache manager. However, processes internal to the storage controller that try to bypass the cache manager to directly read the contents of the memory through a memory function call may be blocked if they are trying to access trap cache segments, because legitimate processes would likely not try to access the trap cache segments through memory function calls.

In a further embodiment, a cache control block for the trap cache segment is generated and a trap flag in the cache control block is set for the trap cache segment to indicate the cache segment in the cache comprises a trap cache segment.

With the above embodiment, the cache control block indicates whether the cache segment is a trap, to allow the system to quickly determine whether access to a cache segment is likely malicious because legitimate processes would not try use memory function calls to read trap segments.

In a further embodiment, indication is made in the cache control block for the trap cache segment that the trap cache segment has valid data and trap data is included in the trap cache segment in the cache.

With the above embodiment, the trap cache segment includes settings to appear as a real cache segment by indicating the trap cache segment has valid data and including trap data in the trap cache segment to entire malicious codes to access and trigger action.

In a further embodiment, the trap data comprises one of random data and simulated user sensitive information.

In a further embodiment, a track is indicated in the storage in a cache control block for the trap cache segment. A read request is received to read data at the track indicated in the cache control block for the trap cache segment. Data at the track in the storage to the trap cache segment is staged in the cache and indication is made that the trap cache segment as not a trap cache segment to use for the accessed track. Read access is provided to the data for the track in the cache.

With the above embodiment, a read request to a cache segment is presumed to be valid, as opposed to a memory function call, so if the read requested track is indicated in a trap cache segment, then the trap cache segment is converted to a non-trap segment and the read data staged into the cache for the request. In this way, any delay in processing a likely legitimate read request is avoided by immediately using the trap cache segment for the read request by staging in the data to the trap cache segment to return to the read request and changing the status of the cache segment to no trap.

In a further embodiment, the read request is sent from a host system communicating over a network and is processed by a cache manager executing in the computer system.

With the above embodiment, read requests from host systems over a network are considered legitimate and the requests to trap segments processed, as distinguished from attempts by function calls within the storage controller by processes to read the trap segments, which are presumed to be malicious.

In a further embodiment, indication is made of a track in the storage in a cache control block for the trap cache segment. A write request is received having write data for the track indicated in the cache control block for the trap cache segment. The write data is written to the trap cache segment in the cache and indication is made that the trap cache segment as not a trap cache segment to use for the track to write.

With the above embodiment, a write request to write data to a trap segment for a track to which the write request is directed is presumed to be valid so the write request is allowed to proceed and the trap segment for the written track is converted to a non-trap segment. By converting the trap segment to use for the write request, the write request is processed immediately without delays so that the use of the trap segment does not introduce delays to write processing.

In a further embodiment, a plurality of trap cache segments are added to the cache.

With the above embodiment, the likelihood of catching a malicious process using a memory function call to read cache is increased by adding more trap cache segments.

In a further embodiment, indication of the trap cache segment to is added to a cache list used to determine cache segments to destage from the cache. In response to initiating a destaging operation, an entry in the cache list is processed to select a cache segment to destage. A determination is made whether the selected cache segment comprises a trap cache segment. Indication of the trap cache segment is moved to a new location in the cache list in response to determining that the selected cache segment comprises the trap cache segment to retain the trap cache segment in the cache. The selected cache segment is destaged in response to determining that the selected cache segment does not comprise the trap cache segment.

With the above embodiment, if an attempt is made to destage a trap cache segment, the trap cache segment is retained in the cache and not destaged according to the cache list by moving indication of the trap cache segment to a new location in the cache list, such as the most recently used end, to retain the trap cache segment in cache in order to maintain constant the number of trap cache segments used to detect malicious processes.

In a further embodiment, the computer system comprises a storage controller in communication with host systems over a network. A read or write request is received from one of the host systems for a target track. A determination is made as to whether the target track is indicated in a cache segment indicated as a trap cache segment. Indication is made that the cache segment for the target track does not comprise a trap cache segment in response to determining the target track is indicated in a cache segment indicated as a trap cache segment. The read or write request with respect to the target track in the cache segment indicated as not comprising a trap cache segment is processed.

With the above embodiment, a read or write request from a host system over a network is presumed by the storage controller to be a legitimate request. For this reason, if the read or write request is directed to a track indicated in a trap cache segment, then the trap cache segment is converted to a not trap cache segment and the read or write request is allowed to proceed against that converted cache segment to avoid any processing delays to a presumed legitimate read or write request.

In a further embodiment, in response to indicating the cache segment as not a trap cache segment, a new trap cache segment is added to the cache having a cache control block indicating a track in the storage not currently stored in the cache and the new trap cache segment is indicated as a trap cache segment.

With the above embodiment, if a trap cache segment is converted to a not trap segment to use for a presumed legitimate read or write request, then a new trap cache segment is added to the cache to maintain the number of trap cache segments constant in order to maintain the same capability to detect malicious code using a memory function call.

DETAILED DESCRIPTION

Currently, a storage controller cannot detect a malicious intrusion based on data accessed. Described embodiments address this problem by configuring a trap cache segment in cache. Malicious processes may sometimes use a memory function call to try to access sensitive and protected data in the cache, whereas legitimate read and write requests are processed through a cache manager and received from an authorized host system. Upon receiving a memory function call to read data in a region of memory, a presumption may be made that the request is malicious and action taken to isolate the process if the region of memory to access includes a trap cache segment, which would likely not be accessed by a legitimate process using a memory function call. In this way, trap cache segments configured in the memory are used to lure and trap malicious processes.

Figure 1:
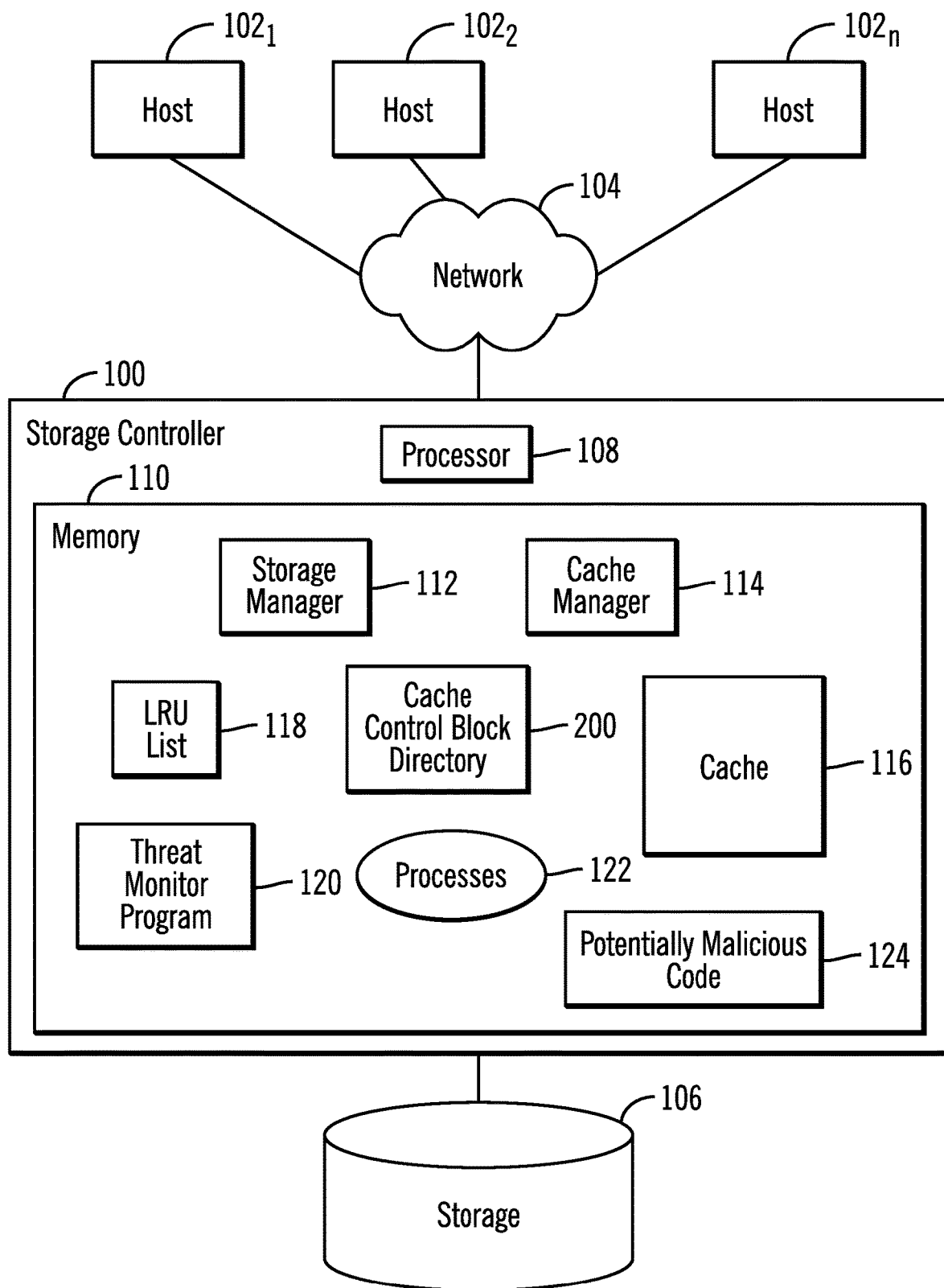
FIG. 1 illustrates an embodiment of a storage environment.

FIG. 1 illustrates an embodiment of a storage environment including a storage controller 100 in communication with host systems $102_1$, $102_2$ . . . $102_n$ over a network 104 to receive Input/Output (I/O) requests to a storage 106. The storage controller 100 includes a processor 108 and a memory 110. The processor 108 may comprise a separate central processing unit (CPU), one or a group of multiple cores on a single CPU, or a group of processing resources on one or more CPUs.

The memory 110 includes a storage manager 112 to manage I/O requests from the host systems $102_1$, $102_2$ . . . $102_n$ to the storage 106 and to configure and manage volumes having extents of tracks configured in the storage 106. The storage manager 112 may also handle memory function calls from local processes 122 to access regions of memory 110. A track comprises any addressable storage unit representing data in storage and memory, also referred to as a block, logical address, logical block address (LBA), physical block address, etc. A cache manager 114 manages caching of tracks from the storage 106 in a cache 116 portion of the memory 110 subject to read and write requests from the host systems $102_1$, $102_2$ . . . $102_n$. The storage manager 112 maintains in the memory 110 a cache control block directory 200 of cache control blocks, where there is one cache control block provided for and representing each cache segment in the cache 116 providing metadata on the track in the cache 116. The cache manager 114 further maintains a least recently used (LRU) list 118 indicating cache segments in the cache 116, where tracks are added to a most recently used (MRU) end of the LRU list 118 and removed from the LRU end of the LRU list 118 to make room in the cache 116 to stage in tracks from the storage 106 according to a cache destaging/demotion algorithm.

The memory 110 further includes a threat monitor program 120 that creates trap cache segments as a honeypot to detect potentially malicious activity from a process 122 executing potentially malicious code 124 in the storage controller system 100, such as a virus, ransomware, etc. Processes 122 may execute legitimate non-malicious application code or potentially malicious code 124. If a process 122 executing in the memory 110 attempts to directly read a region of the memory 110 that includes a trap cache segment, such as a memory dump or access to a specified area or region of the memory, then such process 122 would be considered as executing potentially malicious code 124 and the memory function call would be blocked while determination is made to quarantine and isolate the potentially malicious process $122_M$ or allow the memory function call to proceed if the process 122 is subsequently determined not to be executing potentially malicious code 124.

The storage manager 112, cache manager 114, and threat monitor program 120 are shown in FIG. 1 as program code loaded into the memory 110 and executed by one or more of the processors 107. Alternatively, some or all of the functions may be implemented as microcode or firmware in hardware devices in the system 100, such as in Application Specific Integrated Circuits (ASICs).

The storage 106 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 110 may comprise a suitable volatile or non-volatile memory devices, including those described above.

Figure 2:
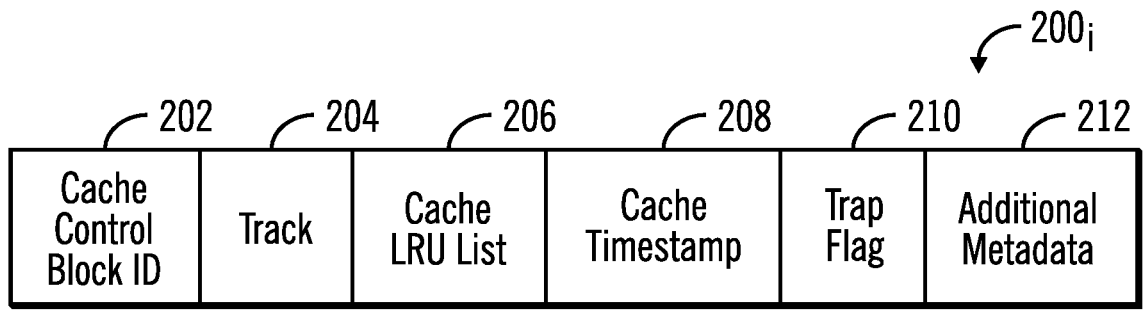
FIG. 2 illustrates an embodiment of a cache control block for a cache segment in cache.

FIG. 2 illustrates an embodiment of a cache control block $200_i$ comprising a realization of a cache segment in the cache 116, including, but not limited to, a cache control block identifier 202, such as an index value of the cache control block $200_i$; a track ID 204 of the track in the storage 106 having sectors staged into the cache 116; the cache Least Recently Used (LRU) list 206 in which the cache control block $200_i$ is indicated; a cache timestamp 208 indicating a time the track was added to the cache 116 and indicated on the LRU list 206; a trap flag 210 indicating whether the cache control block $200_i$ was added for a track staged from the storage 106 into the cache 116 for a read/write request from a host system $102_i$ or a trap cache control block for a trap cache segment created by the threat monitor program 120 as a honeypot to detect malicious processes 122; and additional metadata 212 of information on the cache segment, such as a dirty flag, valid flag, etc. A trap cache control block $200_i$ may include trap information or not include any information for the track ID 204, cache LRU list 206, timestamp 208, and additional metadata 212 because there is not track in the cache segment represented by the trap cache control block $200_i$. There may additionally be a track index mapping tracks to cache segments or cache control blocks of tracks located in the cache 116.

Figure 3:
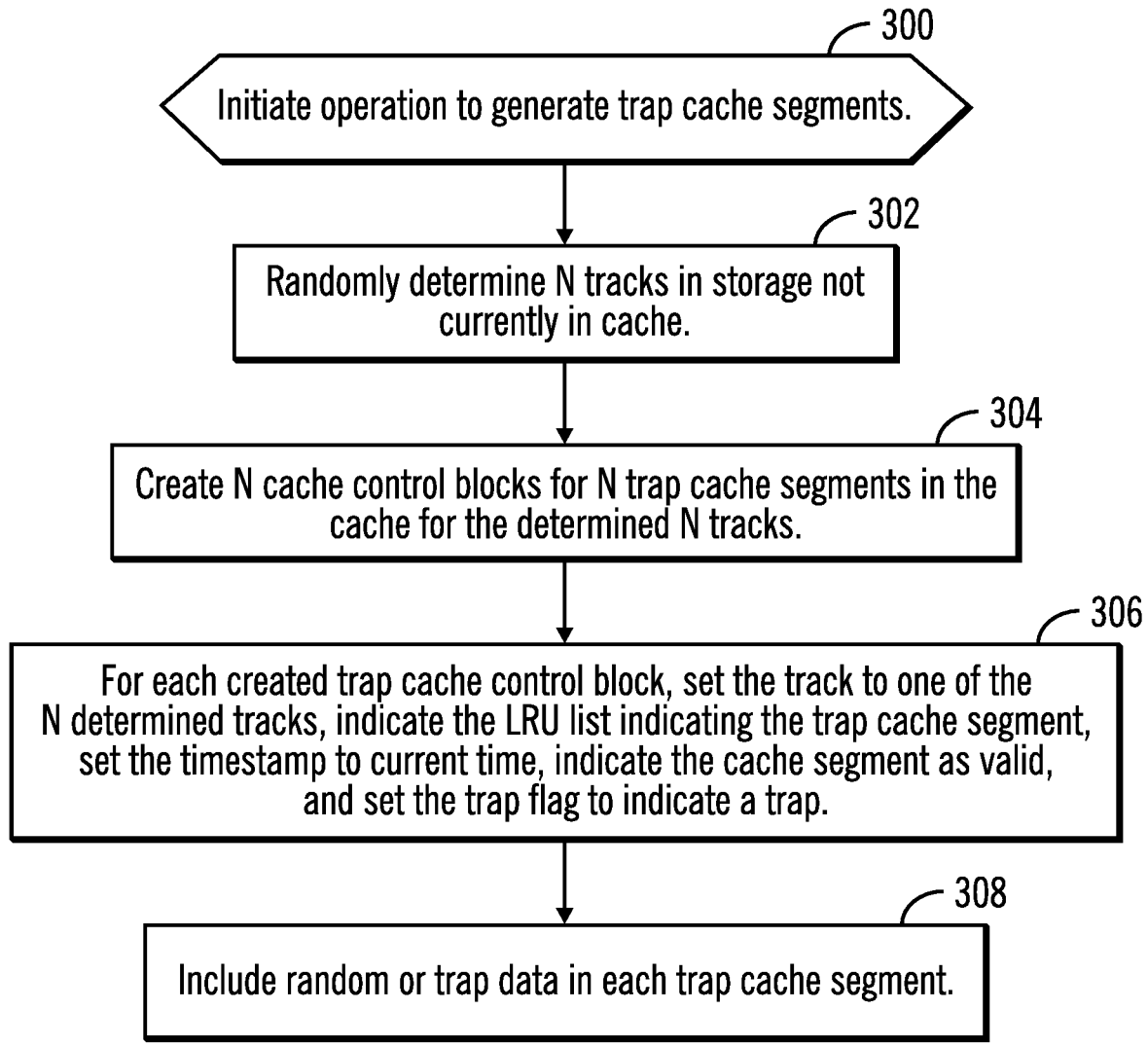
FIG. 3 illustrates an embodiment of operations to generate trap cache segments to detect potentially malicious processes.

FIG. 3 illustrates an embodiment of operations performed by the threat monitor program 120 to generate trap cache segments, which may be performed during storage controller 100 initialization or runtime operations pursuant to predefined settings or initiated by an administrator. Upon initiating (at block 300) the operation, the threat monitor program 120 randomly, or non-randomly, determines (at block 302) N tracks not currently in the cache 116 and creates (at block 304) N cache control blocks $200_i$ for N trap cache segments in the cache 116 for the determined N tracks. The tracks randomly or non-randomly determined may be dispersed throughout the cache 116 addresses to increase the likelihood a malicious process will be detected. For the cache control block $200_i$ for each created trap cache segment, the threat monitor program 120 sets (at block 306) the track 204 to one of the N determined logical addresses, indicates the LRU list 206 indicating the trap segment, sets the timestamp 208 to a current time, indicates in the additional metadata 212 the cache segment as valid, and sets the trap flag 210 to indicate the cache segment as a trap cache segment. The threat monitor program 120 may include (at block 308) random or trap data in each trap cache segment $200_i$ in the cache 116. The trap data may comprise simulated real data, such as simulated or fake sensitive personal and protected information to trap a malicious program.

With the embodiment of FIG. 3, the threat monitor program 120 may create trap cache segments to detect whether a process 122 in the storage controller 100 is trying to access trap cache segments through a memory function call in a manner that would not be performed by a legitimate process. Legitimate processes in the host systems $102_i$ trying to perform read and writes to the cache segments would access cache segments, including trap cache segments identifying a track subject to the host read or write request, through the cache manager 114, which would allow the read/write request to proceed by converting the trap cache segment to a non-trap cache segment for the host read/write request. However, processes internal to the storage controller 100 that try to bypass the cache manager 114 to directly read the contents of the memory 110 through a memory function call may be blocked if they are trying to access trap cache segments, because legitimate processes would likely not try to access the trap cache segments through memory function calls.

Figure 4:
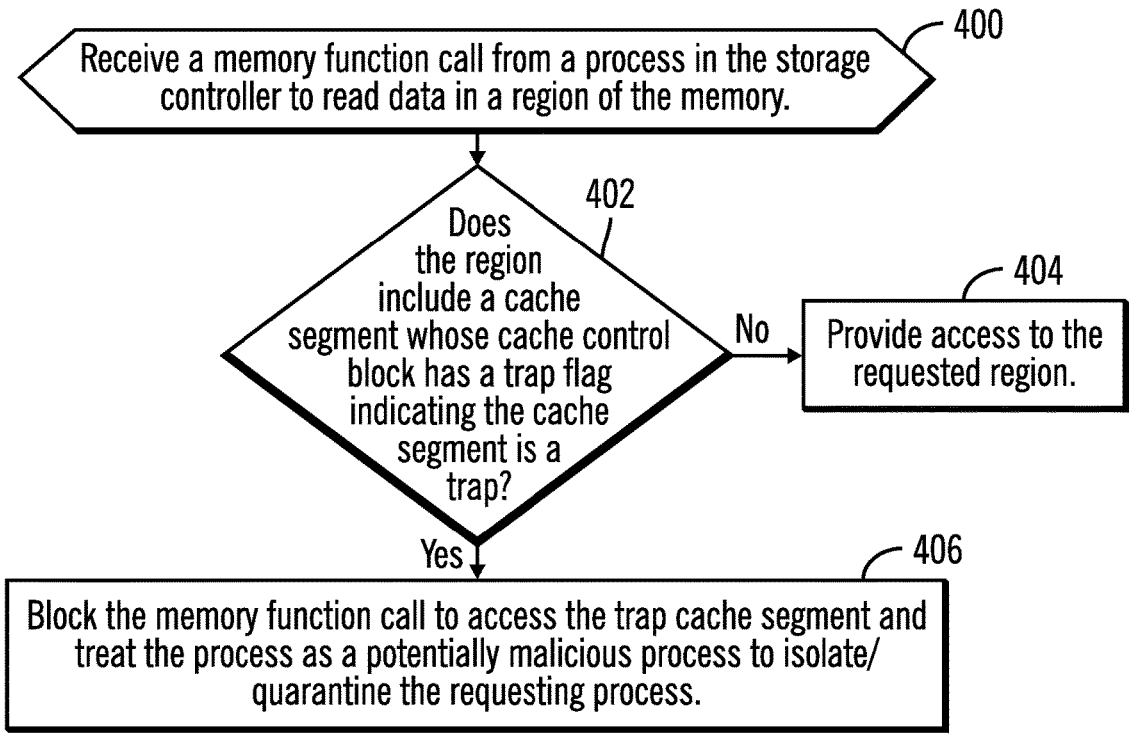
FIG. 4 illustrates an embodiment of operations to process a memory function call from a process.

FIG. 4 illustrates an embodiment of operations performed by the storage manager 112 processing a memory function call from a process 122 in the storage controller 100 to read data in a region of the memory, such as a dump of the memory or to read a specified region of the memory. Upon processing (at block 400) an internal memory function call, the storage manager 112 determines (at block 402) whether the region subject to the memory function call includes a cache segment whose cache control block $200_i$ has a trap flag 210 indicating the requested cache segment is a trap. If (at block 402) the cache segment does not comprise a trap cache segment, then the memory function call is provided (at block 404) access to the requested region. Otherwise, if (at block 402) the region includes a trap cache segment, then the memory function call is blocked (at block 406) and the process 122 invoking the memory function call is isolated and quarantined as a potentially malicious process.

With the embodiment of FIG. 4, local processes 122 attempting to use a memory function call to try to read protected or sensitive information may be identified as potentially malicious code because malicious processes seek access to cache segments providing storage of sensitive and personal information. Further, maintaining multiple trap segments distributed through the cache 116 increases the likelihood of detecting a malicious process trying to bypass the cache manager 114 to directly access cache segments from the memory 110.

Figure 5:
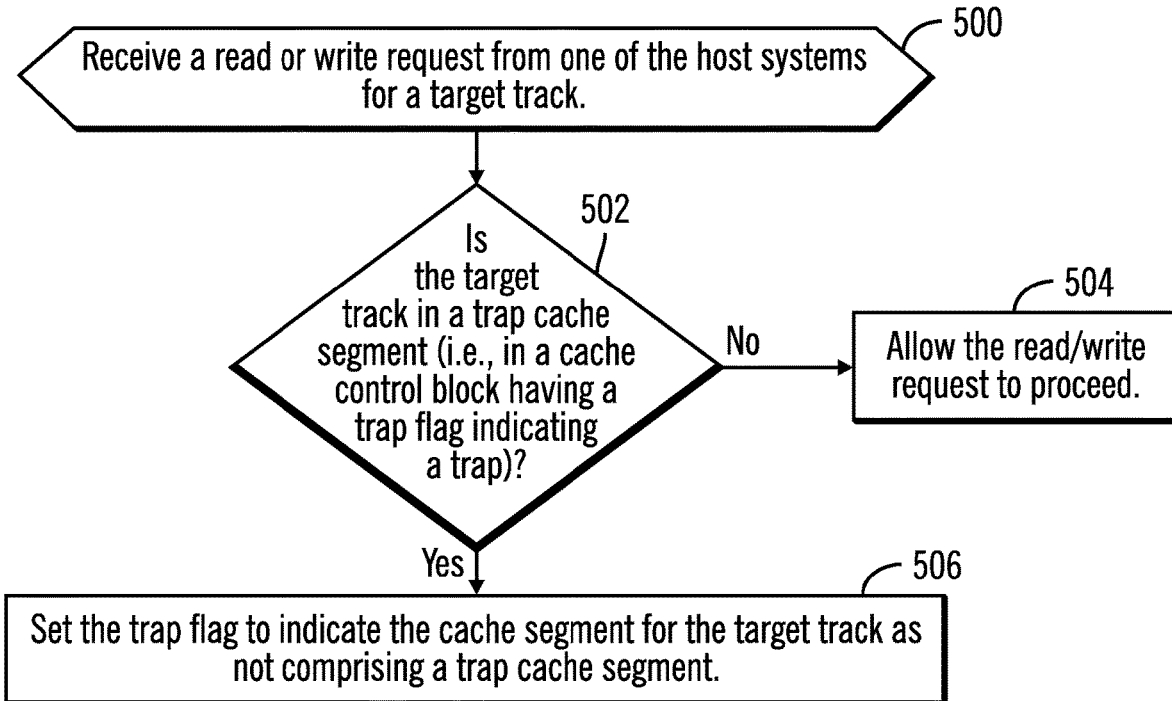
FIG. 5 illustrates an embodiment of operations to process a read or write.

FIG. 5 illustrates an embodiment of operations performed by the cache manager 114 to process a read or write request for a target track in the storage 106 from a process in a host system $102_i$. Upon receiving a read or write request from a host system $102_i$, the cache manager 114 determines (at block 502) whether the target track is in a trap cache segment, i.e., having a cache control block $200_i$ having a trap flag 210 indicating a trap. If (at block 502) the target track is not in a trap cache segment, then the read or write request is allowed to proceed (at block 504) to execute. Otherwise, if the target track of the request is in a trap cache segment, then the trap flag 210 in the cache control block $200_i$ for the cache segment is set (at block 506) to indicate not a trap cache segment, and the read/write request is allowed to proceed (at block 504) using the previous trap cache segment for the operation to the target track, as further described with respect to FIGS. 6 and 7 described below.

With the embodiments of FIGS. 4 and 5, a process $122_M$ attempting to bypass the cache manager 114 to use a memory function call to access a region or dump of the memory 110 is presumed to be malicious if the accessed region includes a trap cache segment. Such access indicates a malicious process $122_M$ because a malicious process looking for sensitive and protected information will often try to access the currently used application data that is in cache segments in the cache 116. However, those processes in host systems $102_i$ or locally 100, that submit a read or write request through the cache manager 114 to a track are not presumed to be malicious. In such case, the read or write request directed to a target track in a trap cache segment are presumed to be legitimate or non-malicious and the read or write is allowed to proceed by changing the status of the cache segment including the track from trap to non-trap cache segment.

Figure 6:
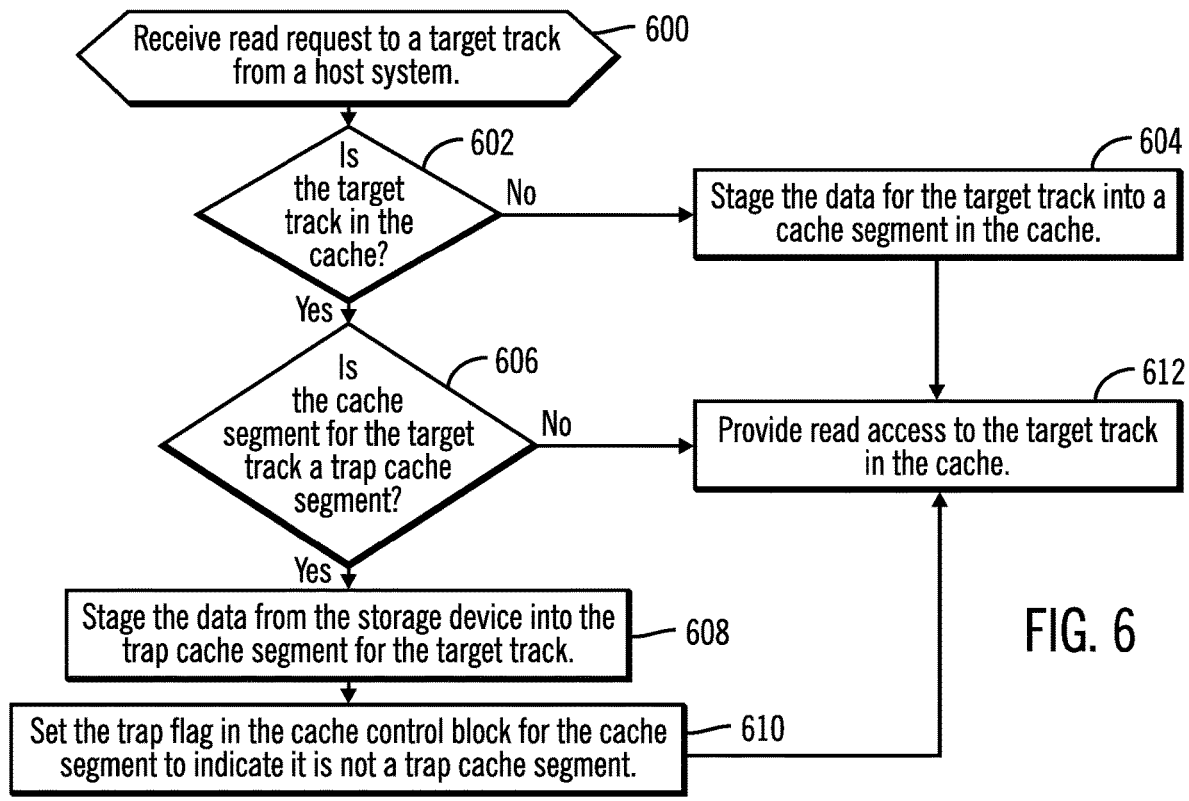
FIG. 6 illustrates an embodiment of operations to process a read request to a target track.

FIG. 6 illustrates an embodiment of operations performed by the cache manager 114 to process a read request from a process in a host system $102_i$ assumed to be legitimate. Upon receiving (at block 600) a read request to a target track in the storage 106 from a host system $102_i$, if (at block 602) the target track is not in the cache 116, i.e., a read miss, then the data for the target track is staged (at block 604) into a cache segment in the cache 116, including creating a cache control block $200_i$ for the added cache segment. If (at block 602) the target track is in the cache 116 and if (at block 606) the cache control block $200_i$ for a cache segment having the target track indicates a trap, i.e., the flag 210 is set to trap, then the data for the track is staged (at block 608) from the storage 106 into the trap cache segment. Further, the trap flag 210 in the cache control block $200_i$ for the trap cache segment is set (at block 610) to indicate the cache segment is no longer a trap. Read access is provided to the target track in the cache 116 if (at block 604) the target track is not in the cache 116, if (at block 606) the cache segment including the target track is not a trap cache segment or if (at block 610) the trap cache segment is changed to a non-trap cache segment.

Figure 7:
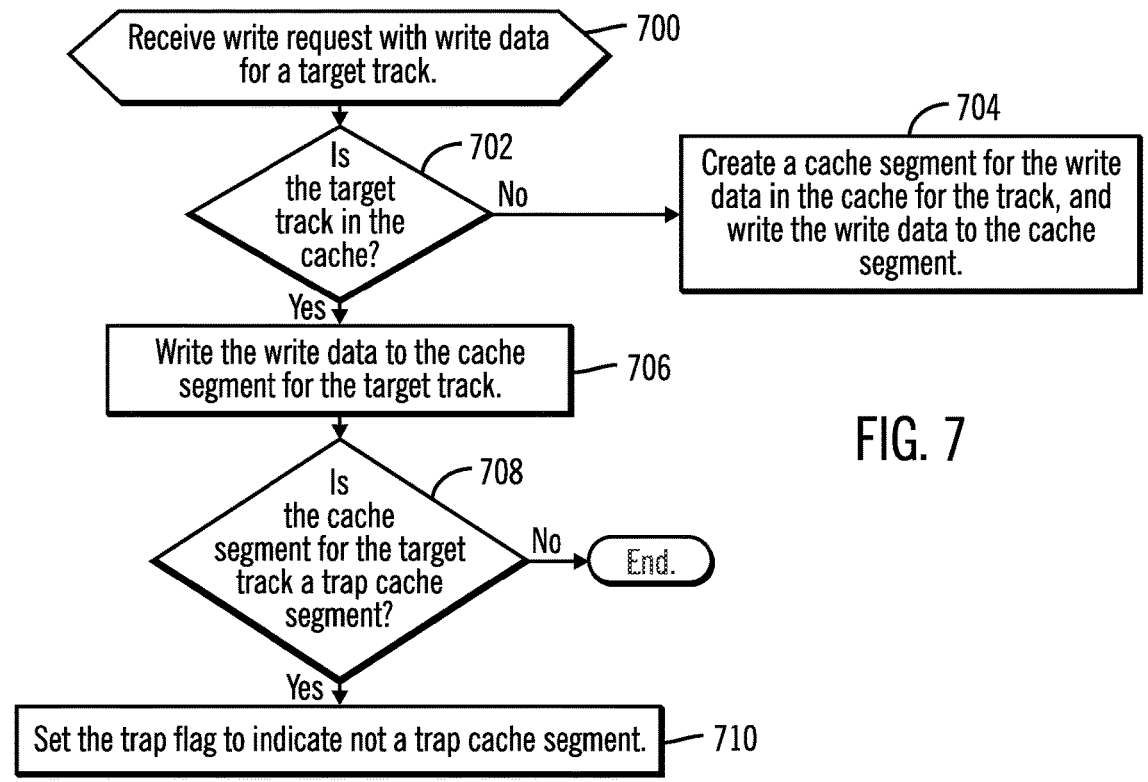
FIG. 7 illustrates an embodiment of operations to process a write request to a target track.

FIG. 7 illustrates an embodiment of operations performed by the cache manager 114 to process a write request from a process in a host system $102_i$ assumed to be legitimate. Upon receiving (at block 700) a write request with write data for a target track in the storage 106 from a host system $102_i$, if (at block 702) the target track is not in the cache 116, then a cache control block $200_i$ for a cache segment for the write data is created (at block 704), which would not comprise a trap cache segment, and the data is written to the cache segment. If (at block 702) the target track is in the cache 116, then the write data is written (at block 706) to the cache segment in the cache 116 for the target track. If (at block 708) the cache control block $200_i$ for a cache segment having the target track indicates a trap, i.e., the flag 210 is set to trap, then the cache control block $200_i$ for the trap cache segment is set (at block 710) to indicate the cache segment is not a trap. If (at block 708 the cache segment including the target track is not a trap cache segment, then control ends.

With the embodiments of FIGS. 6 and 7, if a presumed legitimate read/write request is presented to a target track indicated in a trap cache segment, then the trap cache segment is converted to a non-trap cache segment to use for the read or write request to avoid delays and latency to respond to the request. In this way, latency is reduced by avoiding to have to create a new cache segment for read or write data if there is currently a trap cache segment in the cache 116 for the target track. In other words, an existing cache control block $200_i$ for a target track indicated in a trap cache segment may be used for a legitimate read/write request to the target track indicated in the trap cache segment.

Figure 8:
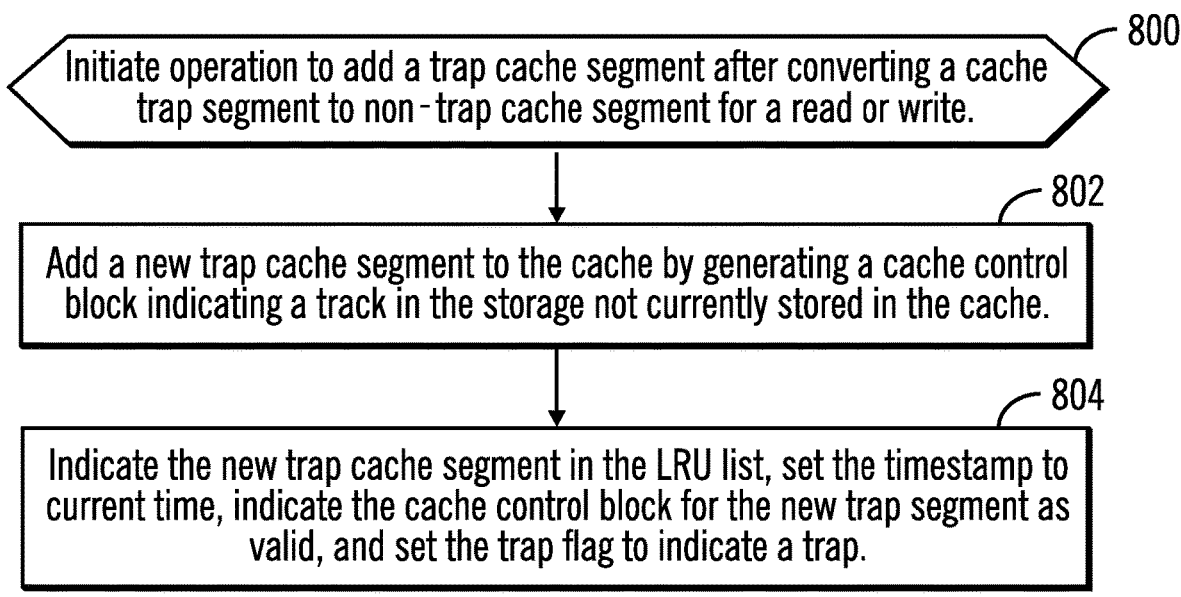
FIG. 8 illustrates an embodiment of operations to add a trap cache segment.

FIG. 8 illustrates an embodiment of operations performed by the threat monitor program 120 or cache manager 114 to add a trap cache segment after converting a trap cache segment to a non-trap cache segment, such as at blocks 506, 610, and 710 in FIGS. 5, 6, and 7, respectively, to maintain a constant level of trap cache segments. Upon initiating (at block 800) an operation to add a trap cache segment, the cache manager 114 adds (at block 802) a new trap cache segment to the cache 116 by generating a cache control block $200_i$ indicating a track in the storage 106 not currently stored in the cache 116. The new trap cache segment is indicated (at block 804) in the LRU list 118, the timestamp 208 is set to a current time, a valid flag is set to indicate the additional metadata 212 as valid, and the trap flag 210 is set to indicate the new cache segment is a trap. The cache segment may or may not be indicated to have updated/dirty data.

With the embodiment of FIG. 8, when converting a trap cache segment for a target track to a legitimate read/write request, a new trap segment is added to replace the trap cache segment changed to a non-trap cache segment for the read/write request. In this way, a same ration of trap to non-trap cache segments is maintained in the cache 116 to provide the same level of detection of potentially malicious processes.

Figure 9:
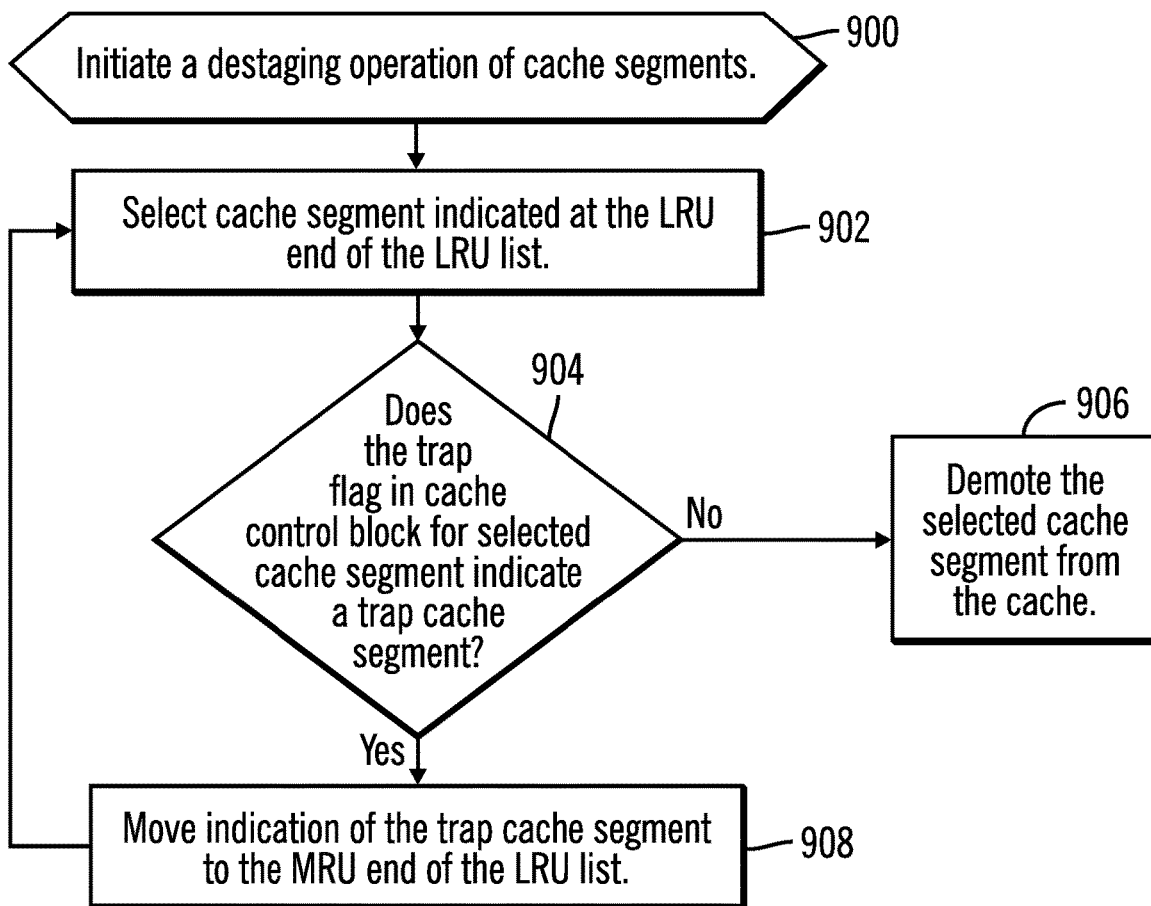
FIG. 9 illustrates an embodiment of operations to destage a trap cache segment.

FIG. 9 illustrates an embodiment of operations performed by the cache manager 114 to handle destaging of a cache segment in the cache 116 to make room for new data to stage into the cache 116. Upon initiating (at block 900) a destaging operation, such as if space is needed to be freed in the cache 116 for a new track to stage into the cache 116, the cache manager 114 selects (at block 902) a cache segment indicated at the LRU end of the LRU list 118. If (at block 904) the trap flag 210 in the cache control block $200_i$ for the selected cache segment to destage indicates the selected cache segment does not comprise a trap, then the selected cache segment is demoted (at block 906) by destaging to the storage 106 if the cache segment has updated data or discarding if the data is not updated. If (at block 904) the cache segment to destage is a trap cache segment, then indication of the trap cache segment is moved (at block 908) to the MRU end of the LRU list 118 to keep that trap cache segment in cache to maintain the ratio of trap to non-trap segments and maintain the malicious code detection level provided by this ratio.

With the embodiment of FIG. 9, trap cache segments are kept in cache 116 to maintain the same level of trap segments to detect malicious processes by not destaging a trap cache segment and moving to the MRU end of the LRU list to maintain in cache 116. In this way, only non-trap cache segments are demoted. In alternative embodiments, trap cache segments may be demoted and new trap cache segments are added to maintain a constant ratio of trap cache segments in the cache 116.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the storage controller 100 and host systems $102_1$, $102_2$ ... $102_n$, may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

Figure 10:
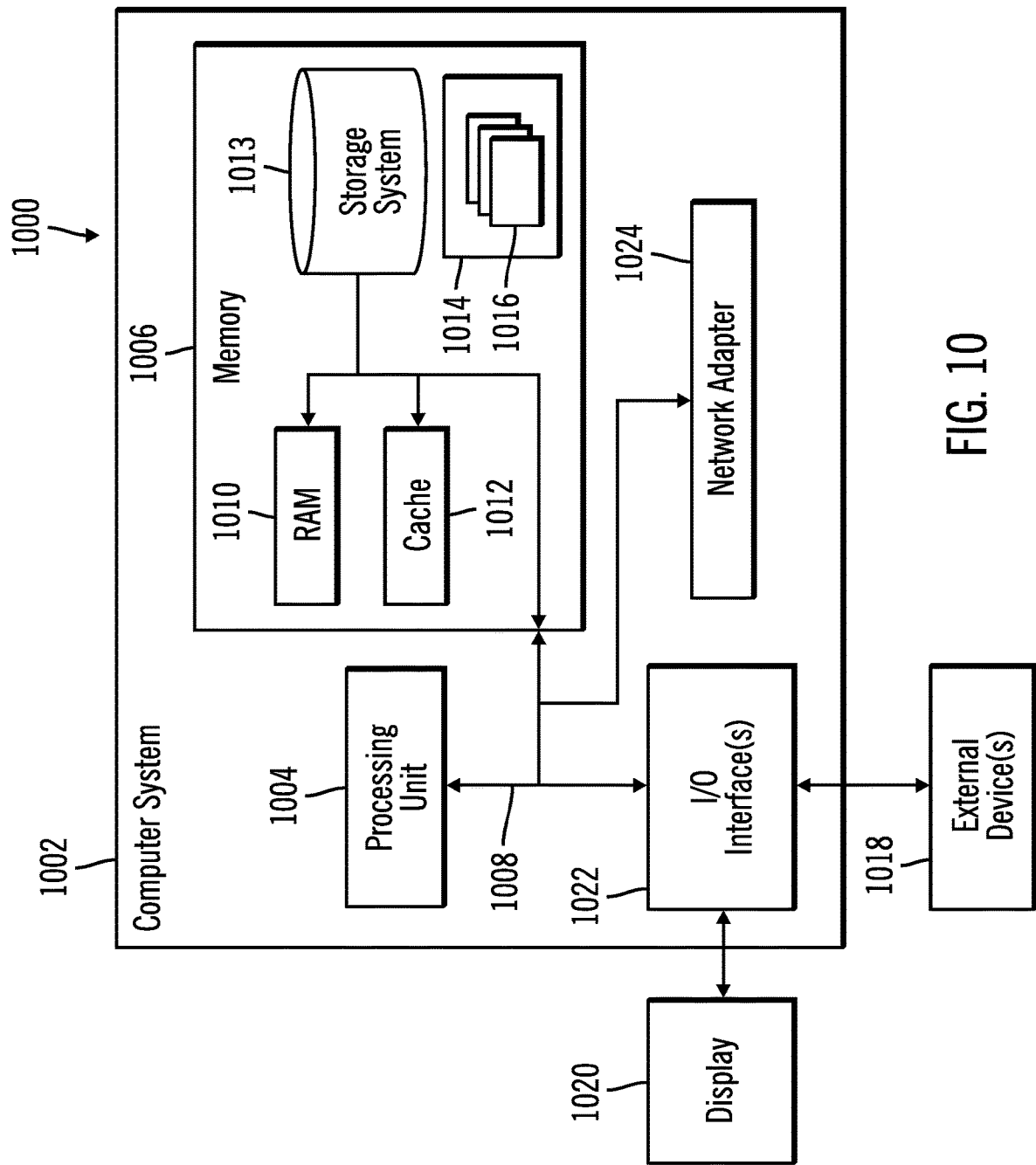
FIG. 10 illustrates a computing environment in which the components of FIG. 1 may be implemented

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for detecting potentially malicious code accessing data in a computer system having a cache to store data from a storage, the computer program product comprising a computer readable storage medium having computer readable program code embodied therein that when executed performs operations, the operations comprising:
    providing a trap cache segment in the cache for a location in the storage;
    processing a call from a process that bypasses a cache manager managing the cache, to read a target cache segment from the cache;
    determining whether the target cache segment of the call from the process comprises the trap cache segment; and
    blocking the call as a potentially malicious process in response to determining that the target cache segment of the call from the process comprises the trap cache segment.

2. The computer program product of claim 1, wherein the operations further comprise:
    generating a cache control block for the trap cache segment; and
    setting a trap flag in the cache control block for the trap cache segment to indicate that the trap cache segment in the cache comprises a trap cache segment.

3. The computer program product of claim 2, wherein the operations further comprise:
    indicating in the cache control block for the trap cache segment that the trap cache segment has valid data; and
    including trap data in the trap cache segment in the cache.

4. The computer program product of claim 3, wherein the trap data comprises one of random data and simulated user sensitive information.

5. The computer program product of claim 1, wherein the process that bypasses the cache manager managing the cache comprises a first process, the operations further comprising:
    processing a call from a second process that accesses the cache manager managing the cache, to read or write to a target cache segment from the cache;
    determining whether the target cache segment of the call from the second process comprises the trap cache segment; and
    providing read or write access to the data in the target cache segment of the call from the second process in response to determining that the target cache segment of the call from the second process comprises the trap cache segment.

6. The computer program product of claim 5, further comprising, in response to determining that the target cache segment of the call from the second process comprises the trap cache segment, indicating the trap cache segment as not comprising a trap cache segment, and adding a new trap cache segment to the cache having a cache control block indicating a track in the storage not currently stored in the cache.

7. The computer program product of claim 1, wherein the operations further comprise:
    adding indication of the trap cache segment to a cache list used to determine cache segments to destage from the cache;
    in response to initiating a destaging operation, processing an entry in the cache list to select a cache segment to destage;
    determining whether the selected cache segment comprises a trap cache segment;
    moving indication of the trap cache segment to a new location in the cache list in response to determining that the selected cache segment comprises the trap cache segment to retain the trap cache segment in the cache; and
    destaging the selected cache segment from the cache in response to determining that the selected cache segment does not comprise the trap cache segment.

8. A system for detecting potentially malicious code accessing data stored in a storage, comprising:
    a processor;
    a cache implemented in a memory device; and
    a computer readable storage medium having computer readable program code embodied therein that when executed performs operations, the operations comprising:
        providing a trap cache segment in the cache for a location in the storage;
        processing a call from a process that bypasses a cache manager managing the cache, to read a target cache segment from the cache;
        determining whether the target cache segment of the call from the process comprises the trap cache segment; and
        blocking the call as a potentially malicious process in response to determining that the target cache segment of the call from the process comprises the trap cache segment.

9. The system of claim 8, wherein the operations further comprise:
    generating a cache control block for the trap cache segment; and
    setting a trap flag in the cache control block for the trap cache segment to indicate that the trap cache segment in the cache comprises a trap cache segment.

10. The system of claim 9, wherein the operations further comprise:
    indicating in the cache control block for the trap cache segment that the trap cache segment has valid data; and
    including trap data in the trap cache segment in the cache.

11. The system of claim 10, wherein the trap data comprises one of random data and simulated user sensitive information.

12. The system of claim 8, wherein the process that bypasses the cache manager managing the cache comprises a first process, the operations further comprising:
    processing a call from a second process that accesses the cache manager managing the cache, to read or write to a target cache segment from the cache;

determining whether the target cache segment of the call from the second process comprises the trap cache segment; and
providing read or write access to the data in the target cache segment of the call from the second process in response to determining that the target cache segment of the call from the second process comprises the trap cache segment.

13. The system of claim 12, further comprising, in response to determining that the target cache segment of the call from the second process comprises the trap cache segment, indicating the trap cache segment as not comprising a trap cache segment, and adding a new trap cache segment to the cache having a cache control block indicating a track in the storage not currently stored in the cache.

14. The system of claim 8, wherein the operations further comprise:
adding indication of the trap cache segment to a cache list used to determine cache segments to destage from the cache;
in response to initiating a destaging operation, processing an entry in the cache list to select a cache segment to destage;
determining whether the selected cache segment comprises a trap cache segment;
moving indication of the trap cache segment to a new location in the cache list in response to determining that the selected cache segment comprises the trap cache segment to retain the trap cache segment in the cache; and
destaging the selected cache segment from the cache in response to determining that the selected cache segment does not comprise the trap cache segment.

15. A method for detecting potentially malicious code accessing data in a computer system having a cache to store data from a storage, comprising:
providing a trap cache segment in the cache for a location in the storage;
processing a call from a process that bypasses a cache manager managing the cache, to read a target cache segment from the cache;
determining whether the target cache segment of the call from the process comprises the trap cache segment; and
blocking the call as a potentially malicious process in response to determining that the target cache segment of the call from the process comprises the trap cache segment.

16. The method of claim 15, further comprising:
generating a cache control block for the trap cache segment; and
setting a trap flag in the cache control block for the trap cache segment to indicate that the trap cache segment in the cache comprises a trap cache segment.

17. The method of claim 16, further comprising:
indicating in the cache control block for the trap cache segment that the trap cache segment has valid data; and
including trap data in the trap cache segment in the cache.

18. The method of claim 15, wherein the process that bypasses a cache manager managing the cache comprises a first process, the method further comprising:
processing a call from a second process that accesses the cache manager managing the cache, to read or write to a target cache segment from the cache;
determining whether the target cache segment of the call from the second process comprises the trap cache segment; and
providing read or write access to the data in the target cache segment of the call from the second process in response to determining that the target cache segment of the call from the second process comprises the trap cache segment.

19. The method of claim 18, further comprising, in response to determining that the target cache segment of the call from the second process comprises the trap cache segment, indicating the trap cache segment as not comprising a trap cache segment, and adding a new trap cache segment to the cache having a cache control block indicating a track in the storage not currently stored in the cache.

20. The method of claim 15, further comprising:
adding indication of the trap cache segment to a cache list used to determine cache segments to destage from the cache;
in response to initiating a destaging operation, processing an entry in the cache list to select a cache segment to destage;
determining whether the selected cache segment comprises a trap cache segment;
moving indication of the trap cache segment to a new location in the cache list in response to determining that the selected cache segment comprises the trap cache segment to retain the trap cache segment in the cache; and
destaging the selected cache segment from the cache in response to determining that the selected cache segment does not comprise the trap cache segment.

* * * * *